United States Patent [19]

Satoh et al.

[11] Patent Number: 4,485,225

[45] Date of Patent: Nov. 27, 1984

[54] METHOD FOR CONTINUOUS COPOLYMERIZATION OF ETHYLENE AND VINYL ACETATE

[75] Inventors: Kenji Satoh; Kiyoshi Yonezu, both of Okayama, Japan

[73] Assignee: Kuraray Co., Ltd., Kurashiki, Japan

[21] Appl. No.: 557,401

[22] Filed: Nov. 30, 1983

Related U.S. Application Data

[63] Continuation of Ser. No. 400,963, Jul. 22, 1982.

[30] Foreign Application Priority Data

Jul. 28, 1981 [JP] Japan .................................. 56-118867
Sep. 14, 1981 [JP] Japan .................................. 56-145231
May 17, 1982 [JP] Japan .................................. 57-83652

[51] Int. Cl.³ .......................................... C08F 218/100
[52] U.S. Cl. ..................................... 526/331; 526/74; 526/210; 526/219; 526/319
[58] Field of Search ................. 526/331, 74, 210, 219, 526/319

[56] References Cited

U.S. PATENT DOCUMENTS

| 2,471,959 | 5/1949 | Hunt ................................... | 260/89.5 |
| 2,492,763 | 12/1949 | Pinkney .............................. | 260/144 |
| 2,586,995 | 2/1952 | Robertson .......................... | 260/192 |
| 3,325,460 | 6/1967 | Schellenberg et al. ............ | 260/87.3 |
| 3,796,696 | 3/1974 | Brown ................................ | 260/87.3 |

FOREIGN PATENT DOCUMENTS

1314409 4/1973 United Kingdom .
1499568 2/1978 United Kingdom .
1517829 7/1978 United Kingdom .

Primary Examiner—Paul R. Michl
Assistant Examiner—Alex H. Walker
Attorney, Agent, or Firm—Barry Kramer

[57] ABSTRACT

The invention provides a method of continuously copolymerizing ethylene and vinyl acetate in a solvent in the presence of a radical initiator without causing gel formation.

7 Claims, No Drawings

METHOD FOR CONTINUOUS COPOLYMERIZATION OF ETHYLENE AND VINYL ACETATE

This application is a continuation of application Ser. No. 400,963, filed July 22, 1982.

BACKGROUND OF THE INVENTION

1. Field of the Invention

This invention relates to a method of continuously copolymerizing ethylene and vinyl acetate in a solvent.

2. Description of the Prior Art

Various methods are known for the polymerization of vinyl monomers. In the case of vinyl acetate polymerization, continuous polymerization methods have been widely employed because of advantages achieved thereby with respect to productivity and uniformity in product quality. Generally, said polymerization reaction, when conducted on a continuous basis, tends to cause polymer and gel formation and accumulation, for instance, on the polymerization vessel wall and in the so-called "dead space" within the vessel where the feed stream becomes sluggish, whereby the heat transfer coefficient is rapidly decreased. Under such circumstances, difficulties arise which render continuous operation over an extended period virtually impossible. Thus, for example, removal of the heat of polymerization becomes extremely difficult or the discharge of the gel-like substances causes line clogging. Cleaning of the polymerization vessel at relatively short time intervals becomes essential, and the advantages of continuous polymerization become severely diminished. Also, in the solution polymerization of ethylene-vinyl acetate co-monomer systems, which is carried out in a homogeneous phase, the formation of gel-like substances and the accumulation thereof causes great difficulties.

The inhibition of gel formation and accumulation has thus been one of the important problems awaiting solution from the viewpoint of stable continuous operation over a long period of time.

To date, there have been no effective methods developed for the prevention of gel formation within the polymerization vessel.

SUMMARY OF THE INVENTION

This invention is directed to a method of continuously copolymerizing ethylene and vinyl acetate in a solvent using a radical initiator which avoids gel formation.

Thus, the present invention provides a method of copolymerizing ethylene and vinyl acetate without causing gel formation which method comprises continuously polymerizing ethylene and vinyl acetate in the presence of a solvent using a radical initiator whose half life (period of half decay), as measured at 60° C., is not longer than 2 hours.

As the radical initiator, 2,2'-azobis(4-methoxy)-2,4-dimethylvaleronitrile) is especially effective, and, as the solvent, methanol or tertiary-butanol is preferably used. The polymerization method according to the present invention also can be applied to copolymerization systems mainly composed of ethylene and vinyl acetate and further containing a third copolymerizable component.

The half life value for each radical initiator as described throughout this specification is detemined in methanol.

While the causes of gel formation within the polymerization vessel are still uncertain, it is currently believed that the chain transfer which occurs in ethylene and vinyl acetate copolymerization results in significant crosslinking and that, with the increase in the degree of crosslinking, the crosslinked byproduct or gel becomes insoluble in the liquid reaction mixture. Furthermore, gel formation also can be correlated with the fact that the existence of ethylene in the dissolved state is an essential condition for providing the site of ethylene-vinyl acetate copolymerization and, with the decrease in vinyl acetate content due to crosslinking, the ethylene concentration increases and the solubility of the crosslinked copolymer decreases.

In order to obtain said copolymer with a relatively high degree of polymerization, it is generally necessary to maintain the solvent concentration at a low level. On the other hand, when the polymerization is carried out continuously while maintaining a low solvent concentration, gel formation and accumulation becomes significant. For instance, in the production of an ethylene-vinyl acetate copolymer saponification product as a molding material, it is desirable to maintain the solvent concentration at a level not higher than 20 percent by weight so as to secure the necessary degree of polymerization. However, in such a low solvent concentration region, gel formation and accumulation becomes excessive. The method of the present invention produces very significant effects at such a low solvent concentration and overcomes the difficulties which have heretofore been associated therewith. When the solvent concentration is greater than 20 percent by weight, gel formation and accumulation become moderate; accordingly, the effects of the present invention are somewhat diminished.

Since the degree of polymerization of said copolymer decreases with an increase in polymerization temperature, a polymerization temperature of not higher than 80° C. is selected in many cases for the purpose of securing a desired degree of polymerization. In such a temperature region, gel-like substances are easily formed. This is presumably associated with the increase in degree of polymerization or in viscosity of the polymerization system, among others. The method of the present invention produces marked effects especially in such a relatively low temperature region and overcomes the above-mentioned difficulties. On the other hand, in the high temperature region above 80° C., the effects of the present invention are diminished due to the decrease in degree of polymerization of the copolymer and in viscosity of the polymerization system, among others. Therefore, a lower polymerization temperature is preferable for the maintenance of the degree of polymerization, but the temperature decrease brings about a decrease in rate of polymerization, hence a difficulty from the economical viewpoint. This difficulty may be overcome, for instance, by increasing the initiator concentration, but the gel formation preventing effect of the present invention tends to decrease in such low polymerization temperature regions below about 35° C., perhaps due to the increase in degree of polymerization, the decrease in rate of decomposition of the initiator and the further increase in viscosity of the polymerization system, among others. From this viewpoint, methanol and tert-butanol are the preferred solvents.

Methanol, which is less expensive, is advantageous from the industrial viewpoint; whereas, tert-butanol is preferred when a high degree of polymerization is required.

For the copolymerization of ethylene and vinyl acetate, it is essential that ethylene is dissolved in the liquid phase composed of vinyl acetate and the solvent within the polymerization vessel, and the required ethylene concentration increases with the increase in ethylene content of the copolymer. The degree of gel-like substance formation and accumulation increases with the increase in ethylene content in the copolymer, presumably due to the decrease in solubility of the gel-like substance in the liquid copolymerization reaction mixture with the increase in ethylene content in the copolymer. Therefore, when the ethylene content is above 60 mole percent, the effect of the present invention shows a tendency to decrease. On the other hand, in the region where the ethylene content is relatively low, it is expected that the gel formation and accumulation is less prominent. However, formation of a considerable amount of polymer gel is observable in said region with a decrease in ethylene content under the same conditions of solvent concentration, polymerization temperature, etc. Although uncertain, this is currently believed to be due to the increase in degree of polymerization of the copolymer with the decrease in ethylene content. When the solvent concentration is lower than 20 percent by weight, this problem is especially significant and accordingly the present invention can be of benefit for copolymerization in such low ethylene content and low solvent concentration regions.

The method of the present invention is also effective in a copolymerization system mainly composed of ethylene and vinyl acetate and further containing a third copolymerizable component. An increased amount of the third component alters the polymer characteristics and, depending on the nature of said third component, the effects of the present invention may be influenced. For enjoying the benefits of the present invention, the third component is preferably a compound of the formula $CH_2CRR'$ (wherein R is a hydrogen atom or a methyl group and R' is a methyl group or COOR which R is defined herein). The content of the third component in the product copolymer preferably ranges from about 0 to 0.1 in terms of the mole ratio thereof to the vinyl acetate component in said copolymer. Where the third component content is higher, the effects of the present invention show a tendency to decrease.

The effects of the present invention can be correlated with the conversion of vinyl acetate in the ethylene-vinyl acetate copolymerization and, when said conversion exceeds 85%, tend to become less prominent. Therefore, a conversion of not more than 80% is preferable.

Gel formation and accumulation also bears a close relationship with the average residence time in the polymerization vessel, and becomes remarkable with decreasing average residence time. Generally, where the average residence time is shorter than 15 hours, gel formation and accumulation are significant. The method of the present invention is especially effective when applied to copolymerization in a region where the average residence time is shorter than 15 hours and therefore, gel formation and accumulation present major problems. More preferably, the method can be applied where said time is shorter than 12 hours. Although, when the average residence time is less than an hour, the gel formation is so intense that the effect of the invention apparently becomes decreased; however, the effect is fully observable when said time is 1.5 hours or longer. It is currently believed that the relationship between the average residence time and the gel formation is associated with changes with time in the polymerization reaction and in the initiator degradation reaction.

Unless an initiator whose half life is less than 2 hours as measured at 60° C. is used, the benefits of the present invention cannot be enjoyed. The half life mentioned herein means the value obtained when measured in methanol. Though uncertain, the correlation between the half life of the initiator and the formation of gel-like substances appear to depend upon the progress of the polymerization reaction and the decomposition of initiator which appear to give rise to the formation of gel-like substances from vinyl acetate. In any case, selection and use of an initiator having a half life as specified herein are important conditions in practicing the present invention.

In practicing the invention, those initiators which have a half life of not longer than two hours and most preferably not longer than one hour are employed. Suitable initiators are, for instance, 2,2'-azobis(2,4-dimethyl-4-methoxyvaleronitrile), 2,2'-azobis(2,4,4-trimethylvaleronitrile), 1,1'-azobis(cyclooctanecarbonitrile), acetyl cyclohexanesulfonylperoxide, bis(4-tert-butylcyclohexyl) peroxydicarbonate and bis(2-ethylhexyl) peroxydicarbonate. More preferred are 2,2'-azobis(2,4-dimethyl-4-methoxyvaleronitrile), 2,2'-azobis(2,4,4-trimethylvaleronitrile) and 1,1'-azobis (cyclooctanecarbonitrile), which have a half life of not longer than an hour.

Ethylene-vinyl acetate copolymers are used not only as they are but also as saponification products which can be prepared by saponification of the copolymers in the presence of a caustic alkali or an alkali metal alcoholate, for instance. Such saponification products have good oxygen barrier properties and are suited for use as materials for the manufacture of food wrappers. In that case, since the saponification products are used as food wrapping materials, it is required that the initiator selected from among those set forth herein should not produce any substantial odor upon treatment with said alkaline substance with heating. From such viewpoint, 2,2'-azobis(2,4-dimethyl-4-methoxyvaleronitrile) is an excellent initiator which can be used without any special limitations for enjoying the benefits of the present invention by applying the same in various fields, because said initiator itself and the decomposition products therefrom do not produce any substantial odors.

The following examples illustrate the present invention in more detail. However, they should by no means be construed as limiting the invention.

EXAMPLE 1

Using a 100-liter polymerization vessel equipped with a cooling coil and a stirrer having 4 paddle-shaped blades, an ethylene-vinyl acetate-propylene copolymer was produced by continuous polymerization. The polymerization conditions were as shown below.

| | |
|---|---|
| Vinyl acetate feed rate | 5.0 kg/hr |
| Methanol feed rate | 0.68 kg/hr |
| Propylene feed rate | 0.1 kg/hr |
| 2,2'-Azobis(4-methoxy-2,4-dimethyl-valeronitrile)feed rate | 2.5 g/hr |
| Polymerization temperature | 60° C. |

| | |
|---|---|
| Ethylene pressure within the polymerization vessel | 45 kg/cm²(G) |
| Average residence time | 7 hrs |

The half life of 2,2'-azobis(4-methoxy-2,4-dimethylvaleronitrile) as measure at 60° C. (in methanol; hereinafter all half life determinations shall have been made in methanol) is about 15 minutes.

As a result, 3.2 kg/hr of an ethylene-vinyl acetate-propylene copolymer with an ethylene content of 34 mole percent was obtained. The conversion of vinyl acetate was about 55%.

Throughout the continuous operation for 50 days, the polymerization temperature was controlled in a very stable manner and the polymer solution discharged from the polymerization vessel did not contain any gel-like substances at all.

After a 50-day continuous polymerization operation, the inside of the polymerization vessel was inspected but there was no adhesion of gel-like substances on the cooling coil, stirrer shaft, four blades or inside wall of the polymerization vessel.

COMPARATIVE EXAMPLE 1

The continuous polymerization procedure of Example 1 was followed under the same conditions except that 2,2'-azobisisobutyronitrile was used as the initiator.

2,2'-Azobisisobutyronitrile was fed at the rate of 3.5 g/hr and its half life at 60° C. was about 22 hours. The ethylene-vinyl acetate-propylene copolymer had an ethylene content of 34 mole percent and the conversion of vinyl acetate was about 55%.

From the third day of continuous polymerization, a gel-like substance was found in the polymer solution discharged from the polymerization vessel. On the 8th day, the polymerization temperature control became unstable and therefore the continuous polymerization was stopped. Inspection of the interior of the polymerization vessel revealed adhesion of about 1.5 kg of a gel-like substance on the cooling coils, stirrer shaft, vessel wall, etc.

EXAMPLE 2

Using the same polymerization vessel as described in Example 1, an ethylene-vinyl acetate copolymer was produced by continuous polymerization. The polymerization conditions were as shown below.

| | |
|---|---|
| Vinyl acetate feed rate | 4.5 kg/hr |
| tert-Butanol feed rate | 0.7 kg/hr |
| 2,2'-Azobis(2,4,4-trimethyl- | 6 g/hr |
| valeronitrile) feed rate | |
| Polymerization temperature | 50° C. |
| Ethylene pressure within the polymerization vessel | 56 kg/cm² (G) |
| Average residence time | 6 hrs |

The half life of 2,2'-azobis(2,4,4-trimethylvaleronitrile) as measured at 60° C. is about 15 minutes.

As a result, 2.7 kg/hr of an ethylene-vinyl acetate copolymer with an ethylene content of 50 mole percent was obtained and the conversion of vinyl acetate was about 45%.

Throughout the continuous polymerization operation for 40 days, no gel-like substance was observed in the polymer solution discharged from the polymerization vessel and polymerization temperature control was controlled in a stable manner. After the 40-day operation, the interior of the polymerization vessel was inspected. The amount of adhering gel was as small as about 50 g.

COMPARATIVE EXAMPLE 2

The continuous polymerization procedure of Example 2 was followed under the same conditions except that tert-butyl perpivalate was used as the initiator.

tert-Butyl perpivalate was fed at the rate of 7.5 g/hr and had a half life at 60° C. of about 6 hours. From the 4th day of continuous polymerization, a gel-like substance was found in the polymer solution discharged from the polymerization vessel. On the 10th day, the polymerization temperature control became unstable and therefore the continuous polymerization was stopped. Inspection of the interior of the polymerization vessel showed about 2.2 kg. of gel-like substance adhering to the cooling coil, interior vessel wall, etc.

EXAMPLE 3–5

Using the same polymerization vessel as described in Example 1, ethylene-vinyl acetate copolymers were produced under the conditions set forth in the table below by continuous polymerization. Throughout 40 days of continuous operation, the polymer solutions discharged from the polymerization vessel did not contain any gel-like substance and the polymerization temperature control was controlled in a stable manner. After the 40-day operation, the interior of the polymerization vessel was inspected. The amounts of adhering gel-like substance were very small, as shown in the table below.

| Example No. | Vinyl acetate feed rate kg/hr | Methanol feed rate kg/hr | Initiator (half life at 60° C.; hr) | Polymerization temperature °C. | Ethylene pressure kg/cm² G | Average residence time hrs | Vinyl acetate conversion % | Ethylene content in copolymer mole % | Amount of gel like substance g |
|---|---|---|---|---|---|---|---|---|---|
| 3 | 4.5 | 0.5 | Bis(4-tert-butyl-cyclohexyl) peroxydicarbonate (1) | 60 | 41 | 8 | 45 | 30 | 10 |
| 4 | 4.0 | 0.4 | Acetyl cyclohexyl-sulfonyl peroxide (0.3) | 50 | 55 | 7 | 45 | 48 | 25 |
| 5 | 5.5 | 0.5 | Bis(2-ethylhexyl) peroxydicarbonate (1) | 65 | 40 | 5 | 60 | 28 | 15 |

COMPARATIVE EXAMPLE 3

The continuous polymerization procedure of Example 3 was followed under the same conditions except that dilauroyl peroxide was used as the initiator.

The half life of dilauroyl peroxide as measured at 60° C. was about 13 hours. From the third day of continuous polymerization, a gel-like substance was found in the polymer solution discharged from the polymerization vessel, and on the 9th day, the valve for discharge of the polymer solution from the polymerization vessel was clogged and therefore the continuous operation was stopped. Inspection of the polymerization vessel revealed about 2 kg of a gel-like substance adhering to the interior vessel wall, cooling coil, etc.

EXAMPLES 6-8

Using the same polymerization vessel as described in Example 1, ethylene-vinyl acetate copolymers were produced under the conditions set forth below by continuous polymerizarion.

| Vinyl acetate feed rate | 3.5 kg/hr |
| --- | --- |
| tert-Butanol feed rate | 0.5 kg/hr |
| Polymerization temperature | 60° C. |
| Ethylene pressure within the polymerization vessel | 50 kg/cm$^2$ (G) |
| Average residence time | 8.5 hrs |
| Initiator used | 2,2'-Azobis(4-methoxy-2,4-dimethylvaleronitrile) |

By adjusting the feed rate of 2,2'-azobis(4-methoxy-2,4-dimethylvaleronitrile), the conversion of vinyl acetate was varied. There were obtained ethylene-vinyl acetate copolymers with ethylene contents of 38-41 mole percent. The vinyl acetate conversion, continuous operation period and amount of gel-like substance are reported in the table below.

| Example No. | Vinyl acetate conversion (%) | Continuous operation period (days) | Amount of adhering gel-like substance (g) |
| --- | --- | --- | --- |
| 6 | 45 | 45 | 0 |
| 7 | 60 | 45 | 15 |
| 8 | 80 | 40 | 30 |

EXAMPLE 9-11

Using the same polymerization vessel as described in Example 1, ethylene-vinyl acetate copolymers with ethylene contents of 30-33 mole percent were produced by carrying out the continuous polymerization under the following conditions.

| Methanol (polymerization solvent) concentration | 10% |
| --- | --- |
| Polymerization temperature | 65° C. |
| Ethylene pressure within the polymerization vessel | 45 kg/cm$^2$ (G) |
| Initiator used | 2,2'-Azobis(4-methoxy-2,4 dimethylvaleronitrile) |
| Vinyl acetate conversion | ca. 40% |

The average residence time was varied by adjusting the vinyl acetate, methanol and initiator feed rates. The data on the average residence time, continuous operation period and amount of adhering gel-like substance found within the polymerization vessel are shown below in the table.

| Example No. | Average residence time (hrs) | Continuous operation period (days) | Amount of adhering gel-like substance (g) |
| --- | --- | --- | --- |
| 9 | 6.5 | 40 | 0 |
| 10 | 4 | 40 | 0 |
| 11 | 2 | 30 | 45 |

EXAMPLES 12-14

Using the same polymerization vessel as described in Example 1, ethylene-vinyl acetate copolymers were produced by carrying out the continuous polymerization under the following conditions.

| Vinyl acetate feed rate | 3.5 kg/hr |
| --- | --- |
| tert-Butanol feed rate | 0.5 kg/hr |
| Polymerization temperature | 60° C. |
| Average residence time | 7-8.5 hrs |
| Initiator used | 2,2'-Azobis(4-methoxy-2,4-dimethylvaleronitrile) |
| Vinyl acetate conversion | ca. 40% |

The ethylene content in the ethylene-vinyl acetate copolymer was varied by adjusting the ethylene pressure within the polymerization vessel. The data on the ethylene content in the polymer, continuous operation period and amount of adhering gel like-substance found within the polymerization vessel are shown below in the table.

| Example No. | Ethylene content in polymer (mole %) | Continuous operation period (days) | Amount of adhering gel-like substance (g) |
| --- | --- | --- | --- |
| 12 | 20 | 30 | 0 |
| 13 | 31 | 30 | 0 |
| 14 | 55 | 30 | 15 |

What is claimed is:

1. A method of producing an ethylene and vinyl acetate copolymer having an ethylene content of less than 60 mole % without causing gel formation which comprises continuously copolymerizing ethylene and vinyl acetate in the presence of a methanol solvent using 2,2'-azobis (2,4-dimethyl- 4-methoxyvaleronitrile) as a radical initiator, said solvent concentration being lower than 20 weight %, wherein the copolymerization temperature ranges from about 35° C. to 80° C., the conversion of vinyl acetate is not more than 85% and the average residence time in the polymerization vessel ranges from 1.5 hours to 15 hours.

2. A method of producing an ethylene and vinyl acetate copolymer having an ethylene content of less than 60 mole % without causing gel formation as claimed in claim 1, wherein the radical initiator is 2,2'-azobis (4-methoxy-2,4-dimethylvaleronitrile).

3. A method of producing a copolymer having ethylene and vinyl acetate as main comonomers and having an ethylene content of less than 60 mole % without causing gel formation which comprises continuously copolymerizing ethylene and vinyl acetate as main comonomers together with a further copolymerizable comonomer of the formula $CH_2CRR'$ wherein R is a hydrogen atom or a methyl group or a COOR group wherein R is as defined above, in the presence of a methanol solvent using 2,2'-azobis(2,4-dimethyl-4-methoxyvaleronitrile) as a radical initiator, said solvent concentration being lower than 20 weight %, wherein the copolymerization temperature ranges from about 35° C. to 80° C., the conversion of vinyl acetate is not more than 85% and the average residence time in the polymerization vessel ranges from 1.5 hours to 15 hours.

4. A method of producing a copolymer having ethylene and vinyl acetate as main comonomers and having an ethylene content of less than 60 mole % without causing gel formation as claimed in claim 4, wherein the radical initiator is 2,2'-azobis(4-methoxy-2,4-dimathyl-valeronitrile)

5. A method of producing an ethylene and vinyl acetate copolymer having an ethylene content of less than 60 mole % without causing gel formation as claimed in claim 1, wherein the radical initiator is selected form the group consisting of 2,2'-azobis (2,4-dimethyl-4-methoxyvaleronitrile), 2,2'-azobis (2,4,4-trimethylvaleronitrile) and 1,1'-azobis-(cyclooctanecarbonitrile).

6. A method of producing a copolymer having ethylene and vinyl acetate as main comonomers and having an ethylene content of less than 60 mole % without causing gel formation as claimed in claim 4, wherein the radical initiator is selected from the group consisting of 2,2'-azobis(2,4-dimethyl-4-methoxyvaleronitrile), 2,2'-azobis(2,4,4-trimethylvaleronitrile) and 1,1'-azobis(cyclooctanecarbonitrile).

7. A method of producing an ethylene and vinyl acetate copolymer having an ethylene content of less than 60 mole % without causing gel formation as claimed in claim 1 wherein the radical initiator is selected from the group consisting of 2,2'-azobis(2,4-dimethyl-4 methoxyvaleronitrile) and 2,2'-azobis(2,4,4-trimethylvaleronitrile).

* * * * *

UNITED STATES PATENT AND TRADEMARK OFFICE
CERTIFICATE OF CORRECTION

PATENT NO. : 4,485,225
DATED : Nov. 27, 1984
INVENTOR(S) : Kenji Satoh et al

It is certified that error appears in the above-identified patent and that said Letters Patent is hereby corrected as shown below:

In Claim 3, in the first line below the formula, after the first appearance of the word "group" and before the word "or", insert --and R' is a methyl group --.

In Claim 4, line 5, "-dimathyl-" should read -- -dimethyl- --.

Signed and Sealed this

Ninth Day of April 1985

[SEAL]

Attest:

DONALD J. QUIGG

Attesting Officer

Acting Commissioner of Patents and Trademarks